United States Patent
Ritschel

(10) Patent No.: US 7,492,119 B2
(45) Date of Patent: Feb. 17, 2009

(54) CIRCUIT ARRANGEMENT FOR GENERATING MOTOR CHARACTERISTIC CURVES

(75) Inventor: Sten Ritschel, Bannewitz (DE)

(73) Assignee: Saia-Burgess Dresden GmbH, Dresden (DE)

( * ) Notice: Subject to any disclaimer, the term of this patent is extended or adjusted under 35 U.S.C. 154(b) by 162 days.

(21) Appl. No.: 11/695,704

(22) Filed: Apr. 3, 2007

(65) Prior Publication Data
US 2007/0236165 A1    Oct. 11, 2007

(30) Foreign Application Priority Data
Apr. 6, 2006    (DE) .................. 10 2006 017 429

(51) Int. Cl.
*H02P 1/46* (2006.01)
(52) U.S. Cl. .................. 318/721; 318/700; 363/98
(58) Field of Classification Search ........... 318/721, 318/700, 400.26, 400.3; 363/98, 109
See application file for complete search history.

(56) References Cited

U.S. PATENT DOCUMENTS 4,777,579 A * 10/1988 Jahns et al. .......... 363/98
5,517,401 A * 5/1996 Kinoshita et al. ..... 363/98
6,020,712 A * 2/2000 Roesel et al. ........ 318/705

FOREIGN PATENT DOCUMENTS

| DE | 3509451 A1 | 9/1986 |
| DE | 195 33 276 A1 | 3/1997 |
| DE | 200 08 483 U1 | 10/2000 |
| WO | 02/095926 A1 | 11/2002 |

* cited by examiner

*Primary Examiner*—Rina I Duda
(74) *Attorney, Agent, or Firm*—Christa Hildebrand, Esq.; Norris, McLaughlin & Marcus

(57) ABSTRACT

A circuit arrangement (1) for generating motor characteristic curves, in particular for stabilizing the pull-out torque of a two-phase synchronous motor (2) by using a series-connected element (14). The series-connected element (14) is connected between a first line conductor (12.1) formed as a neutral conductor and the common phase (11) of the synchronous motor (2), and a second line conductor (12.2) implemented as a conductor is connected with a phase of the synchronous motor (2). A transistor-diode combination (3) is employed as a voltage-controllable series-connected element (14), whereby for obtaining an approximately constant sinusoidal AC voltage amplitude and/or AC current amplitude through the synchronous motor (2), the transistor (4) designed for the maximum peak voltage of the oscillating line voltage and having an operating point controllable by an analog control signal is a non-switched bipolar transistor or field effect transistor (FET), and the diodes (6) are implemented as a rectifier bridge (5).

10 Claims, 10 Drawing Sheets

Prior Art

Prior Art

Us=30 vac, Ust=Ube=0V, Voltage drop across controller Uce. Approx.30 V (RMS)

Us=30 vac →Voltage drop across controller Uce. = 12 V (RMS)

Us=24 vac →Voltage drop across controller Uce. = 7 V (RMS)

Us=24 vac →Voltage drop across controller Uce. = 2 V (RMS)

CIRCUIT ARRANGEMENT FOR GENERATING MOTOR CHARACTERISTIC CURVES

BACKGROUND OF THE INVENTION

1. Field of the Invention

The present invention relates to a circuit arrangement for generating motor characteristic curves, in particular for stabilizing the motor pull-out torque of a two phase synchronous motor by using a series-connected element, wherein the series-connected element is connected between a first line conductor formed as a neutral conductor and the common phase of the synchronous motor, and a second line conductor implemented as a conductor is connected with a phase of the synchronous motor.

2. Description of the Related Art

Synchronous motors are reliable actuators for many price-sensitive applications in the field of automotive and office communication, medical technology, tool making, consumer electronics, building equipment or measurement technology.

In the building equipment field, synchronous motors are employed, for example, as valve actuators for heating equipment. By combining a relatively small synchronous motor with the gear, very high actuating forces can be produced due to the gear reduction.

Because synchronous motors operate directly on the AC voltage grid, there is typically no need to change the operating voltage. The second phase for synchronous motors configured for two-phase operation is formed from the line phase by a phase capacitor $C_M$. Commonly used is a parallel connection, whereby a common phase is formed.

Operation of synchronous motors with different line voltages typically requires as a series-connected element an ohmic resistor $R_V$ or a capacitive resistance $C_V$.

The rotation speed of the synchronous motor is determined by its design, in particular by the number of poles 2p of a stator, and the frequency f of the power grid. The rotation speed does not depend on the torque.

The synchronous motor rotates with a synchronous rotation speed and can hence be loaded from idle speed to a maximum torque without changing its rotation speed. This maximum torque is referred to as pull-out torque $M_K$. It represents a stability limit for the synchronous motor, because at higher applied loads the synchronous motor runs unstable and comes to a stop. It is disadvantageous for the practical applications that the pull-out torque $M_K$ is voltage-dependent. There exists a direct proportionality $M_K=f(U)$ between the pull-out torque $M_K$ and the supply voltage U, so that precisely limiting the torque of the synchronous motor becomes very difficult due to line voltage tolerances.

Conventional applications of synchronous motors which require torque limitation include a combination of synchronous motor/synchronous gear motor and a spring mechanism, whereby the spring mechanism activates a micro-switch at a specified motor load torque which is less than the pull-out torque $M_K$, wherein the micro-switch then switches the synchronous motor off.

In another alternative embodiment for intentionally switching a synchronous motor off when a specified motor load torque is reached, a coupling/clutch with permanent magnets for force transmission or a friction coupling is provided. In addition to the advantage provided by this mechanical switch-off, the same mechanism can be used in operation for switching the motor off during overload as for switching the motor off at the end of the control range of a synchronous motor. However, a not insignificant disadvantage should be noted, for example the need to employ additional mechanical elements, mechanical wear, reduced service life, the necessity to provide one or more disconnecting elements, or adjustment or control of the switch-off characteristic during production.

A circuit arrangement for switching synchronous motors off is known from WO 02/095926 A1 and DE 200 08 483 U1. By using only a single AC voltage switching element, an inexpensive and reliable implementation of the motor turn-off is achieved when the pull-out torque is exceeded. However, the maximal torque at the time of blocking is here also strongly dependent on the line voltage.

In summary, it can be stated that conventionally thyristors, triacs, photo-triacs, relays and micro-switches are used for limiting the torque of actuators through final disconnection of the supply voltage.

DE 19533076 A1 also describes a control circuit for synchronous motors, whereby asynchronous startup of the motor is realized with a triac.

When using thyristors or triacs, the control circuit is frequently combined with a phase angle control. In this way, the effective AC voltage can de effectively and intentionally reduced and/or controlled. A typical example for an application is a light dimmer. However, employing a phase angle control is disadvantageous for controlling the pull-out torque $M_K$ of synchronous motors, because the higher harmonics interfere with the synchronism of the synchronous motor and thereby produce additional noise. Additional noise emission can be eliminated and the proper operation of the adequately dimensioned phase capacitor can be maintained only if the voltage curve remains approximately sinusoidal.

The conventional circuit arrangement described in DE 3509451 A1 uses a pulsed switch operating with a high clock rate for solving the disadvantages of a phase angle control, such as the strong humming of motors. This pulsed switch is controlled by pulse width modulation (PWM), thereby maintaining a sinusoidal supply current. The pulsed switch formed as transistor operates always with very short switching times, preferably with frequencies above the audible range. The high efficiency of this pulsed circuit and the low thermal load of the controller are achieved at the "expense" of a rather complex bypass circuit, or free-wheeling circuit, which is expensive to implement. This bypass circuit must be synchronized with the pulsed circuit to prevent high peak switching voltages that could destroy components. The solution is unsuitable for cost reasons when using claw pole motors with rated powers of several watts. Compared to the general excepted state of the art, there remains the question if employing a classic frequency converter AC/DC-DC/AC would not have the same cost, while providing additional advantages in practical applications. A particular disadvantage of the solution are the interference emissions, both on the line and radiated, which are generated by the fast switching flanks of the pulsed switch. It has been observed that such pulsed power switches require additional costly protective measures regarding electromagnetic compatibility.

SUMMARY OF THE INVENTION

It is therefore an object of the invention to propose a circuit arrangement for adjusting motor characteristic curves, in particular the pull-out torque of a two-phase synchronous motor, which enables both torque limitation and is capable of detecting and switching off of the synchronous motor after overloading or after reaching the limit stops, even when the supply voltage varies.

According to the basic idea of the invention, the circuit arrangement for adjusting motor characteristic curves, in particular for stabilizing the pull-out torque of a two-phase synchronous motor, includes a series-connected element, wherein the series-connected element is connected between a first line conductor formed as a neutral conductor and the common phase of the synchronous motor, and a second line conductor implemented as a conductor is connected with a phase of the synchronous motor. According to the invention, a transistor-diode combination is employed as a voltage-controllable series-connected element, wherein for obtaining an approximately constant sinusoidal AC voltage amplitude and/or AC current amplitude through the synchronous motor, the transistor designed for the maximum peak voltage of the oscillating line voltage and having an operating point controllable by an analog control signal is a non-switched bipolar transistor or field effect transistor, and the diodes are implemented as a rectifier bridge.

The present invention therefore eliminates the disadvantages of a free-wheeling circuit and electromagnetic compatibility by implementing load reduction without employing pulse width modulation or frequency modulation of a pulsed switch.

The underlying rationale for the circuit arrangement of the invention for adjusting motor characteristic curves is the use over many years in the past of mechanical overload couplings for stepper motors and synchronous motors and the idea that the motor itself represents a type of the electromagnetic coupling, i.e., it loses steps during overload. This problem can be technically solved with a series-connected resistor, which is always automatically adjusted depending on the instantaneous line voltage or the motor current.

Depending on the resistance value, a different portion of the line voltage drops across the series-connected element. The series-connected element is formed as a transistor-diode combination and can be controlled according to the invention such that the AC voltage amplitude across the synchronous motor always remains constant. With this constant voltage, the motor current also remains constant for a constant motor temperature. The resulting dissipated power causes of the series-connected resistant to heat up and limits the practical application of this principle to small synchronous motors with a power rating of several watts.

To protect the transistor from the naturally occurring alternating supply voltage of the synchronous motor, several diodes are employed which form a rectifier bridge. These diodes are dimensioned depending on the magnitude of the supply voltage of the synchronous motor. Typical supply voltages for synchronous motors are 24 VAC or 230 VAC, and the diodes are dimensioned accordingly.

When using a transistor with AC voltage or when using a rectifier bridge with pulsed DC voltage, it should be noted that the voltage across the transistor constantly changes, but that the differential resistance should always remain approximately constant.

For generating the analog internal control voltage $U_{St}$ of the bipolar transistor, an internal evaluation and control unit is used, to which the load current of the bipolar transistor or the voltage drop across the synchronous motor is applied. For signal transmission, the evaluation and control unit is hereby coupled with the base of the bipolar transistors, the voltage point U+ of the rectifier bridge is coupled with the collector of the bipolar transistor, and the voltage point U− of the rectifier bridge is coupled with the emitter of the bipolar transistor as well as with the evaluation and control unit.

Conversely, when using a field effect transistor (FET) for generating the internal control voltage $U_{St}$ of the FET, an evaluation and control unit is used to which only the load current of the FET can be applied. The voltage point U+ of the rectifier bridge is here coupled with the drain of the FET, the evaluation and control unit is coupled with the source of the FET and the voltage point U− of the rectifier bridge, and the gate of the FET is coupled with the voltage point U− of the rectifier bridge.

According to the invention, a normally-on SFET is used as FET, which is controlled by the voltage drop at a current-sensing resistor disposed between the source and the voltage point U−.

In an advantageous modification of the invention, the evaluation and control unit is coupled with the motor coils and the transistor for voltage measurement and monitoring. The core idea of the invention is to use voltage measurement and monitoring and/or in addition a phase angle measurement at the motor coils for electronic detection of the end position of the synchronous motor, in combination with the aforementioned series-connected element.

In another embodiment of the invention, the evaluation unit is located remote from the control unit. The external control unit is implemented as a micro-controller and generates a control voltage for the transistor. In addition to the internal evaluation and control unit, the external control unit is also coupled with the motor coils and the transistor for voltage measurement and monitoring.

This arrangement of internal evaluation unit and external control unit requires galvanic separation. This is implemented in practice, for example, by using an opto-coupler.

For switching the synchronous motor off when reaching the end positions, the transistor is completely blocked and the common phase of the synchronous motor is interrupted. According to the invention, the transistor is then controlled in analog mode to maintain a constant pull-out torque $M_K$ during normal operation; in the event of an overload, the transistor is able to operate in addition as a power line switch.

The objects and advantages of the invention can be more clearly evaluated and understood after reading the following detailed description of preferred, but not limiting exemplary embodiments of the invention in conjunction with the drawings, which show in:

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
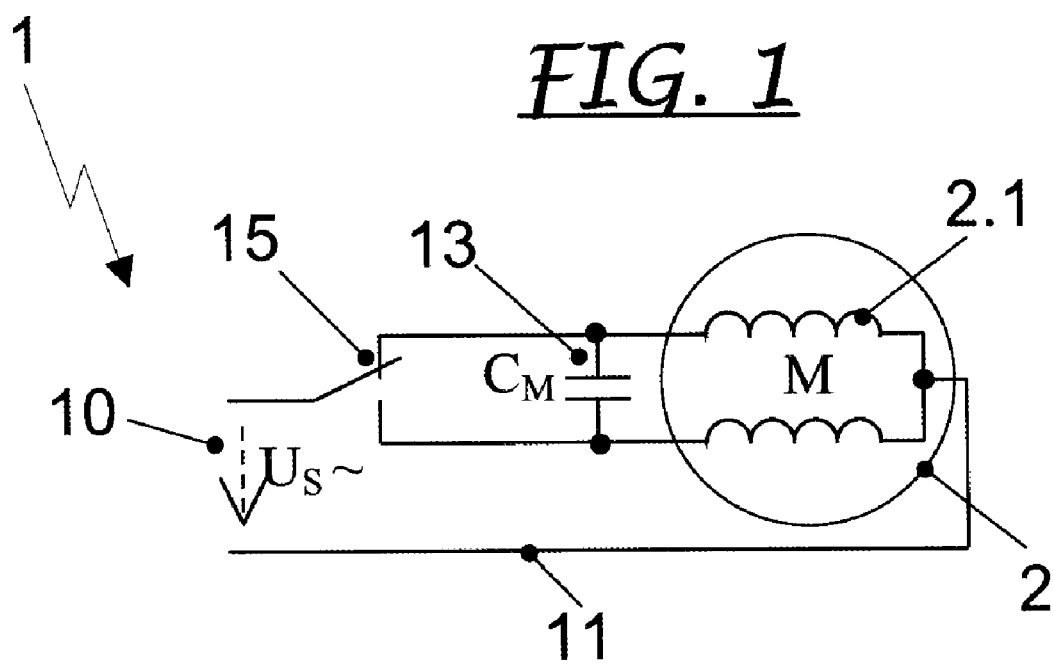
FIG. 1 a conventional circuit arrangement for controlling a synchronous motor with a phase capacitor $C_M$, FIG. 2 a conventional circuit arrangement for controlling a synchronous motor with a voltage-independent series-connected element $R_V$ or $C_V$, FIG. 3 a schematic diagram showing the dependence of the pull-out torque $M_K$ of the synchronous motor on the motor supply voltage, FIG. 4 a circuit arrangement for controlling a synchronous motor with a voltage-controllable series-connected element, FIG. 5 a circuit arrangement for controlling a synchronous motor with a series-connected element implemented as a bipolar transistor-diode combination, FIG. 6 a circuit arrangement for controlling a synchronous motor with a series-connected element implemented as a FET-diode combination, FIGS. 7-10 oscillograms showings the voltage across the transistor $U_{CE}$ and the controlled phase current through a motor winding for different line voltages.

FIG. 1 shows a conventional circuit arrangement 1 for controlling a synchronous motor 2 with a phase capacitor $C_M$ 13. The second phase for the illustrated two-phase synchronous motor 2 is formed from the line phase of the line voltage 10 by the phase capacitor $C_M$ 13. Commonly used is a parallel connection for forming a common phase 11. The motor coils are here indicated with the reference symbol 2.1 and the switching element for reversing the rotation direction of the synchronous motor 2 is indicated with the reference symbol 15.

Figure 2:
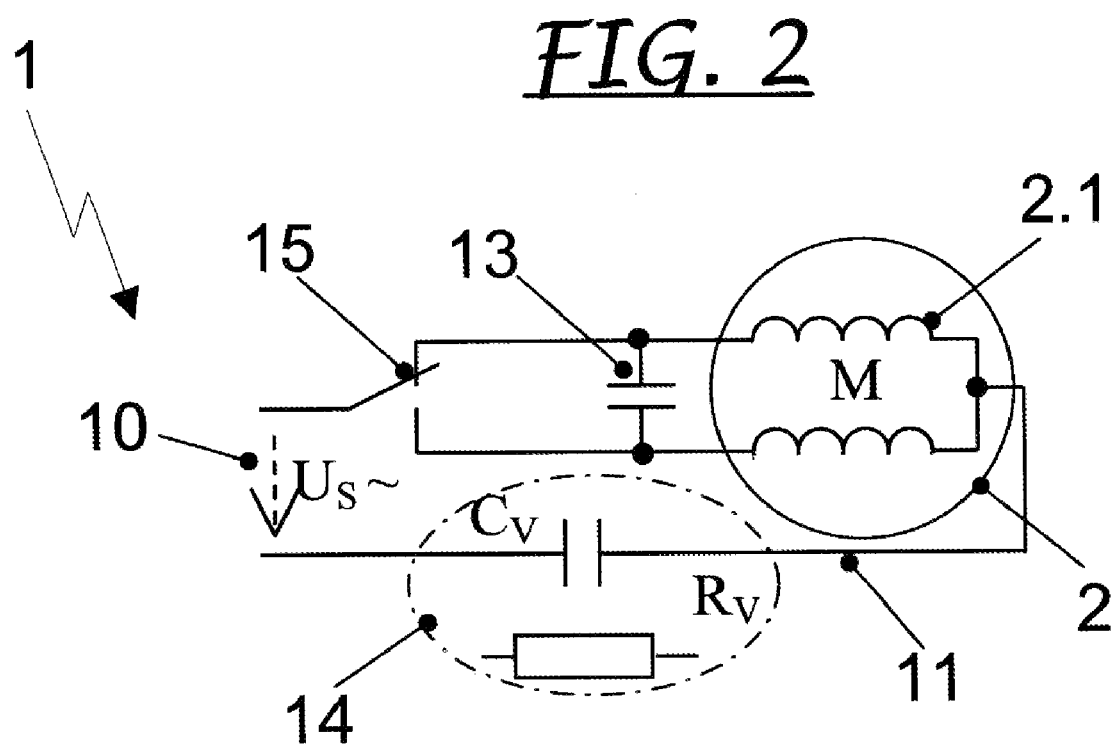

FIG. 2 shows a conventional circuit arrangement 1 for controlling a synchronous motor 2 with a voltage-independent series-connected element 14. The second phase is here also formed from the line phase of the line voltage 10 by a phase capacitor $C_M$ 13. For operating synchronous motors 2 which different line voltages 10, the voltage-independent series-connected element 14 can be implemented as an ohmic resistor $R_V$ or as a capacitive resistance $C_V$. The common phase 11 of the synchronous motor, its motor coils 2.1 and the switching element 15 for reversing the rotation direction of the synchronous motor 2 correspond to those shown in FIG. 1.

Figure 3:
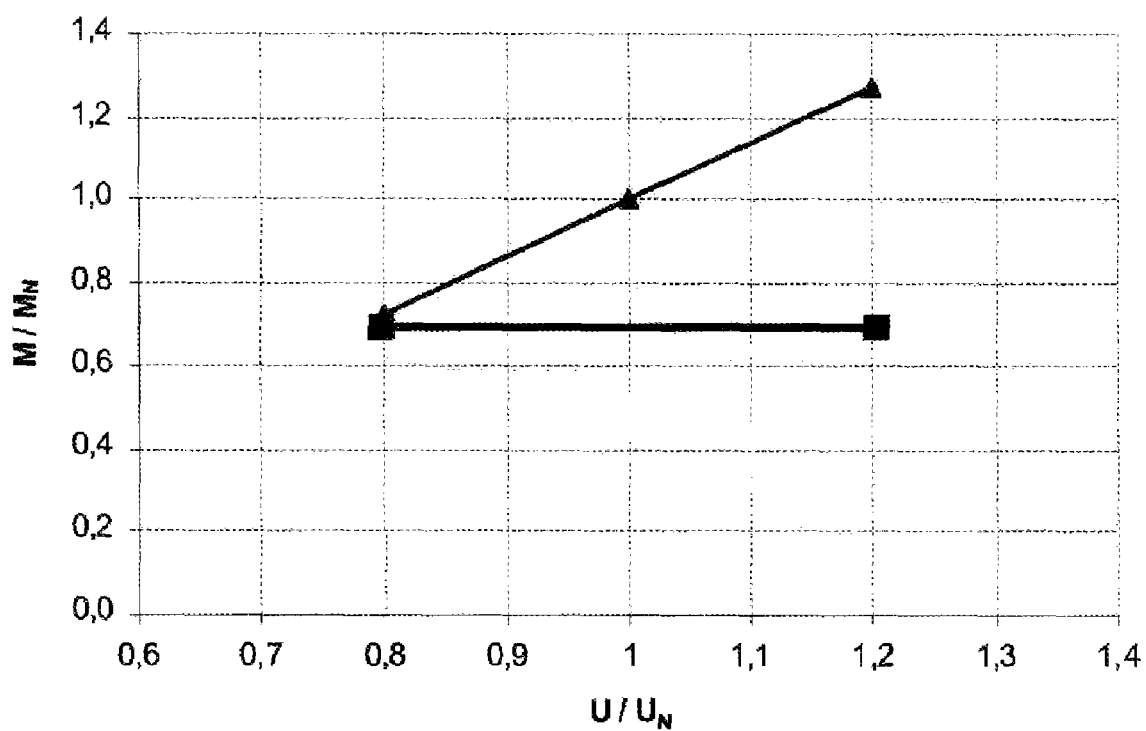

FIG. 3 illustrates in form of a schematic diagram the dependence of the pull-out torque $M_K$ of the synchronous motor 2 on the motor supply voltage. The sloped curve shows how a change in the motor supply voltage affects the pull-out torque $M_K$ in conventional embodiments. Conversely, the horizontal graph shows the solution of the object according to the invention, namely maintaining a constant voltage across the synchronous motor 2 by using a voltage-controllable series-connected element 14 as described in FIGS. 4 to 10.

Figure 4:
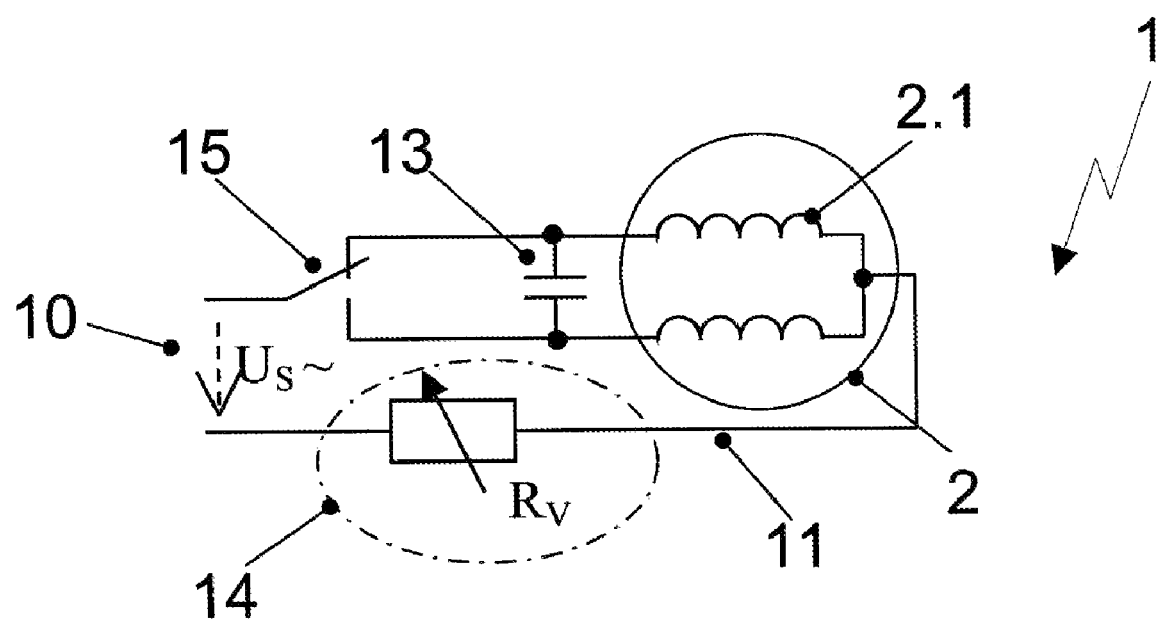

FIG. 4 shows a circuit arrangement 1 according to the invention for controlling a synchronous motor 2 with a voltage-controllable series-connected element 14. The basic configuration of the circuit arrangement 1 with phase capacitor $C_M$ 13, motor coils 2.1 of the synchronous motor 2, common phase 11 as well as switching element 15 for reversing the direction of the synchronous motor 2 corresponds to that of FIG. 2.

Depending on the resistance value, a different portion of the line voltage drops across the series-connected element 14. The series-connected element 14 can be controlled such that the voltage across the synchronous motor 2 remains constant. Due to the constant voltage, the motor current is also constant for a constant motor temperature.

Figure 5:
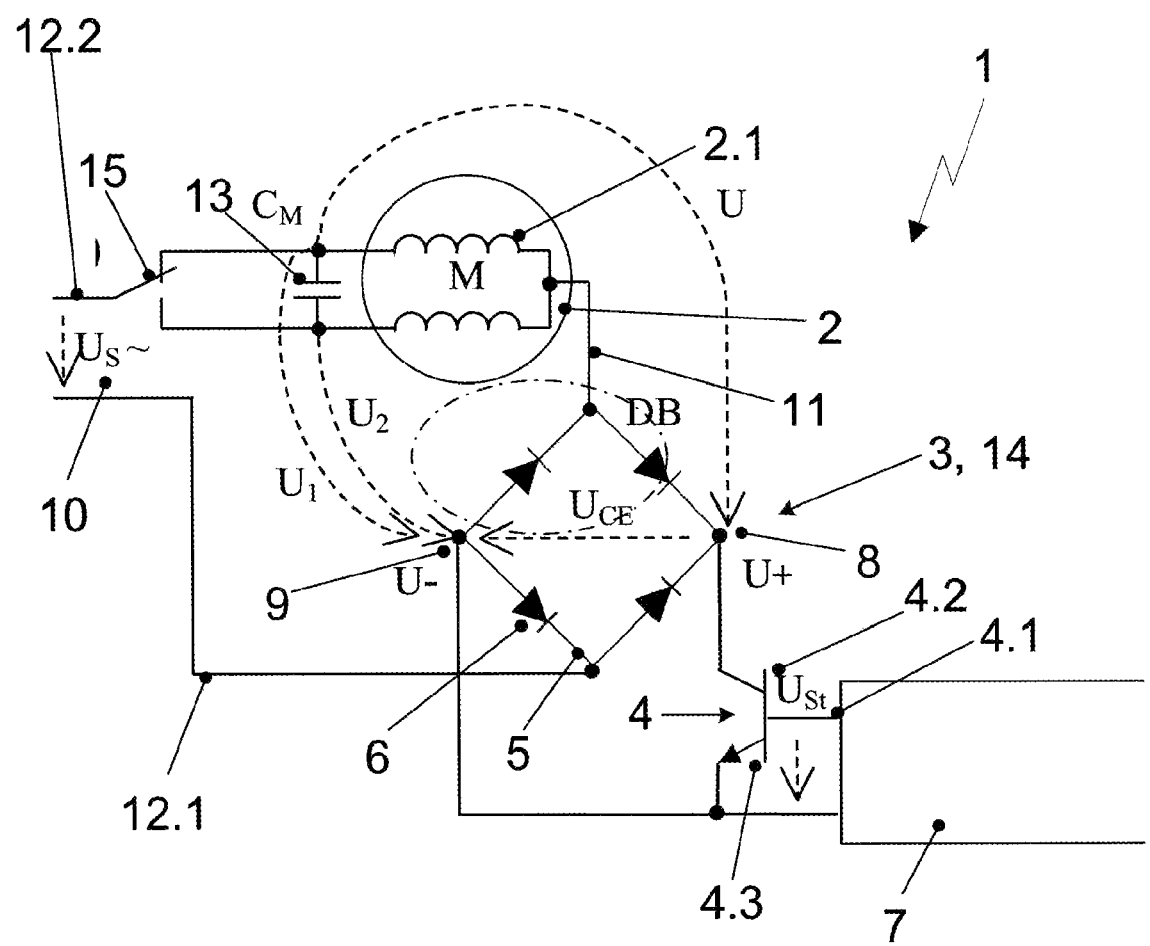

FIG. 5 shows a circuit arrangement 1 according to FIG. 4 for controlling a synchronous motor 2 with a series-connected element 14 implemented as a transistor-diode combination 3. The controllable series-connected element 14 is preferably implemented as a bipolar transistor which is protected from an alternating AC voltage by a diode circuit formed as a rectifier bridge 5. The bipolar transistor is located between the circuit connection points U−9 and U+8 of the rectifier bridge 5. The circuit connection point U+8 is hereby connected with the collector 4.2 of the bipolar transistor, and the circuit connection point U−9 is connected with the emitter 4.3 of the bipolar transistor. With this transistor-diode combination 3, the voltage across the electronic switch or across the bipolar transistor has always the same polarity. The bipolar transistor can be controlled in an analog manner at its base 4.1 by the control voltage $U_{St}$. The control voltage $U_{St}$ is referenced to the potential U− and hence also to the supply voltage $U_S$ 10. Because of this potential reference, the circuit arrangement 1 must be electrically isolated. For generating the control voltage $U_{St}$ of the bipolar transistor, an internal evaluation and control unit 7 is employed to which the load current of the bipolar transistor can be applied. The voltage point U−9 of the rectifier bridge 5 is coupled for signal transmission with both the emitter 4.3 of the bipolar transistor and the evaluation and control unit 7. The internal evaluation and control unit 7 is connected via the rectifier bridge 5 with the motor coils 2.1 and the bipolar transistor for voltage measurement and monitoring. Advantageously, in addition to voltage measurement and monitoring, a phase angle measurement at the motor coils 2.1 can also be employed for electronic detection of the end position of the synchronous motor 2.

Figure 6:
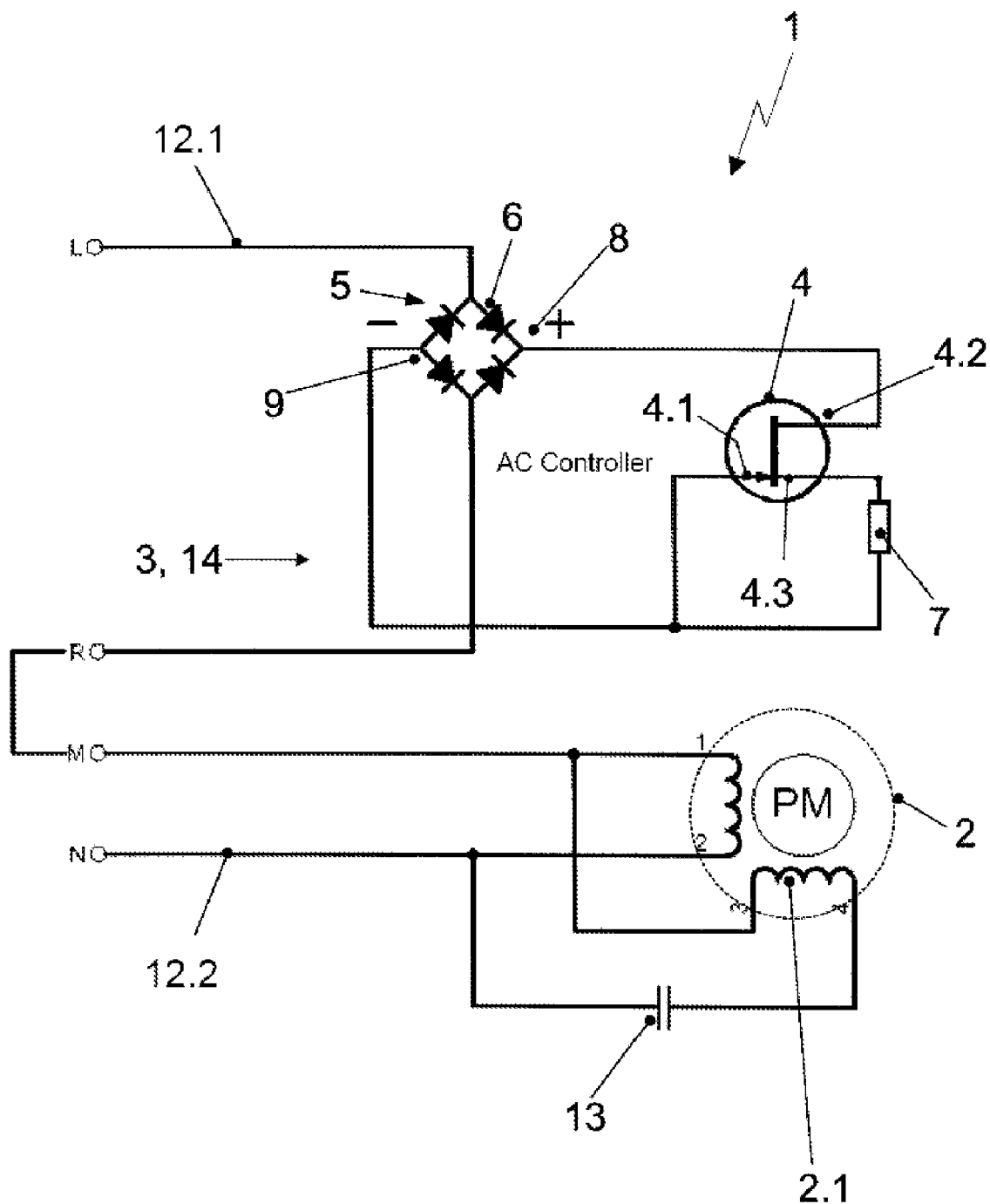
Figure 7:
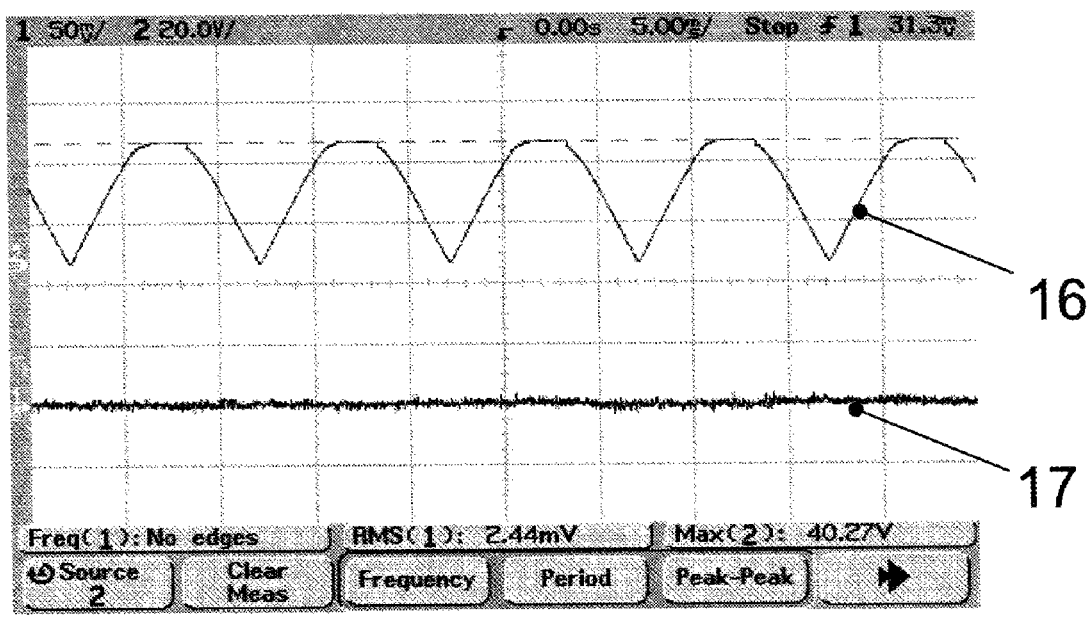
Figure 8:
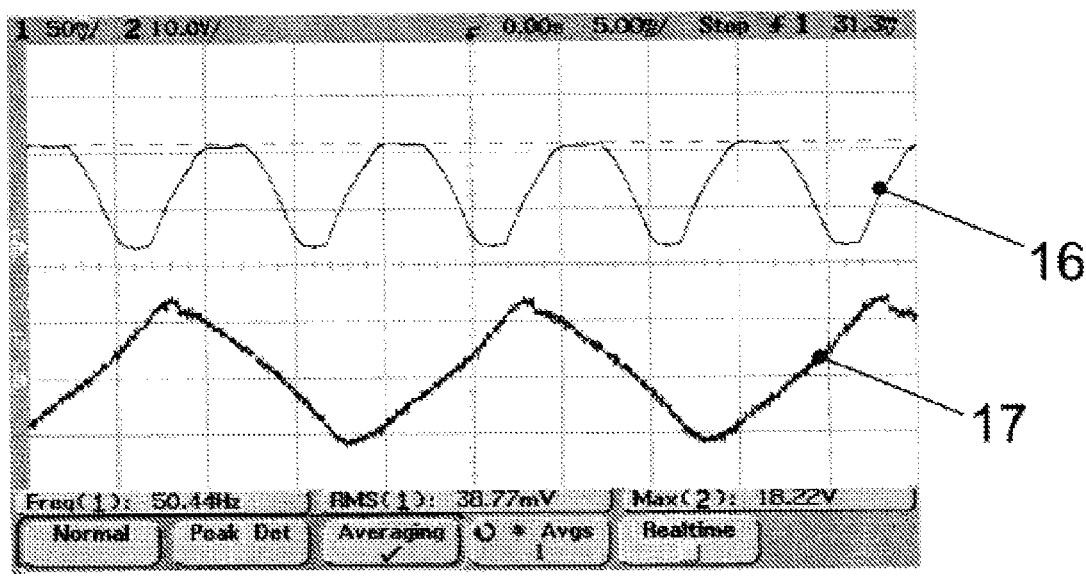
Figure 9:
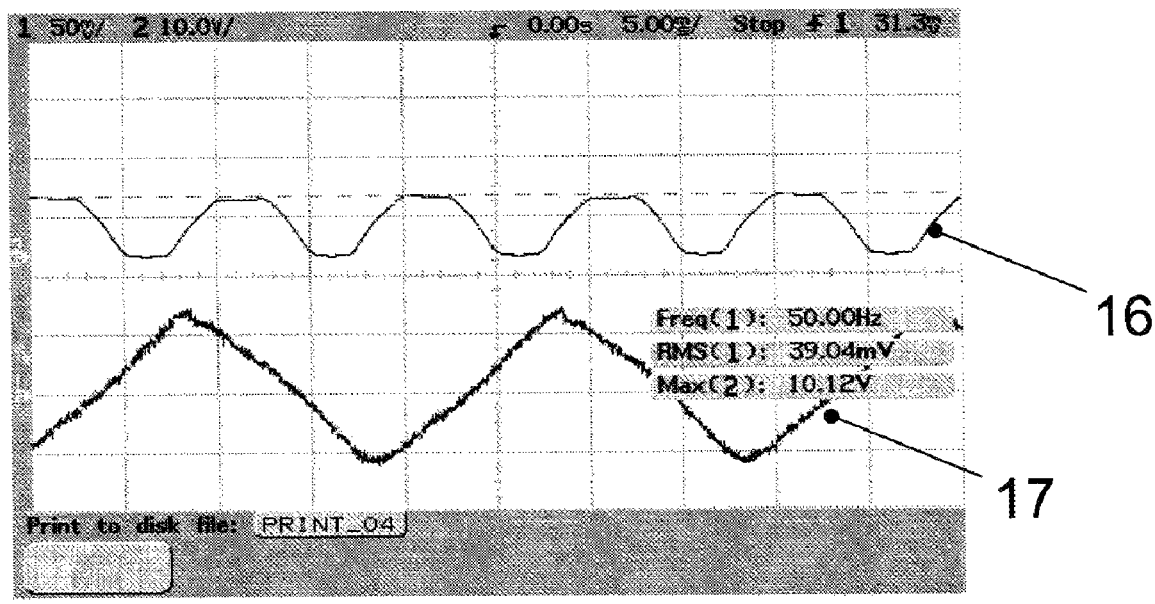
Figure 10:
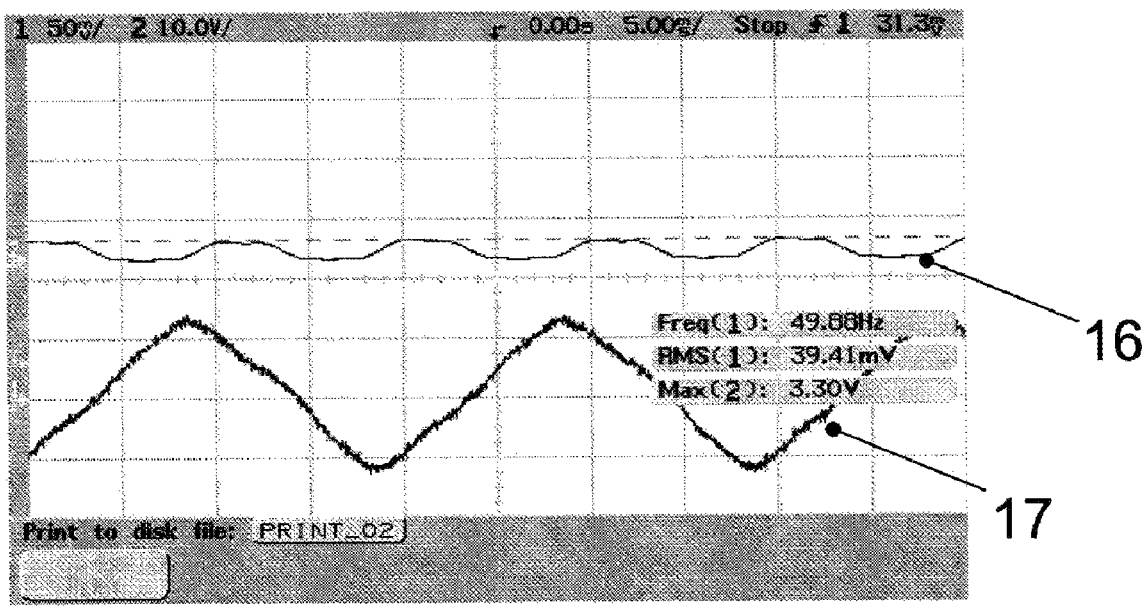

FIG. 6 shows a circuit arrangement 1 according to FIG. 4 for controlling a synchronous motor 2 with a series-connected element 14 implemented as a FET-diode combination 3. The controllable series-connected element 14 is hereby implemented as a FET, which is protected from the alternating AC voltage by a diode circuit implemented as a rectifier bridge 5. The FET is located between the circuit connection points U−9 and U+8 of the rectifier bridge 5. A current-sensing resistor is used as internal evaluation and control unit 7, which is located between source 4.3 of the FET and the voltage point U−9 of the rectifier bridge 5. The voltage point U+ 8 of the rectifier bridge 5 is also coupled with the drain 4.2 of the FET, and the gate 4.1 of the FET is coupled with the voltage point U−9 of the rectifier bridge and hence also with the source 4.3 of the FET. The circuit arrangement of FIG. 6, implemented as a combination of a normally-on depletion layer FET (depletion-mode junction field effect transistor) with a current-sensing resistor in a diode bridge, represents the simplest embodiment of the series-connected element of the invention. Depending on the required precision for controlling the pull-out torque $M_K$, additional components may be provided for adjustment and temperature compensation of the operating point. Advantageously, with this embodiment of the invention, a phase angle measurement at the motor coil 2.1, in addition to voltage measurement and monitoring, can be used for electronic detection of the end position of the synchronous motor 2. The reference symbols 12.1 and 12.2 indicate the first and the second line conductor.

The oscillograms depicted in FIGS. 7 to 10 together with FIG. 5 represents the obtained control characteristic for a Saia-Burgess synchronous motor UCR 12 with a nominal voltage of 24 VAC.

The respective voltage across the transistor $U_{CE}$ (upper curve) 16 and the controlled phase current through a motor coil 2.1 (lower curve) 17 are shown for different line voltages $U_S$ and/or control voltages $U_{St}$. At a control voltage $U_{St}$=0V, the bipolar transistor 4 representing a switch is completely blocked, and the synchronous motor 2 is completely switched off. The controller of the evaluation and control unit 7 is operated with the control voltage $U_{St}$ in an active region, and the phase current 17 is adjusted to a nominal value of 39 mA. This stabilizes also the pull-out torque and the overload torque, respectively.

The voltage U across the motor coils 2.1 can be calculated by measuring the two peaks values of the AC voltages $U_1$ and $U_2$ as well as the peak voltage of U+ with reference to the potential U−. Based on the relationship $M_K$=f(U), the evaluation and control unit 7 can therefore be used with reference to the potential U− for maintaining the peak value of the voltage across the motor coils 2.1 approximately constant, thereby ensuring a pull-out torque $M_K$ that is independent of the line voltage. For the situation $U_1 > U_2$:

$$\hat{U} \approx \hat{U}_1 - \hat{U}_{CE},$$

and for the other position of the switching element 15 with reversed rotation direction of the synchronous motor 2:

$$\hat{U} \approx \hat{U}_2 - \hat{U}_{CE}.$$

Detection of an end position, which indirectly affects the control of the bipolar transistor 4, is necessary in actuator applications of the synchronous motor 2, in addition to control of the maximum motor torque, so that the synchronous motor 2 can be switched off without employing additional switching elements, such as limit switches. The aforedescribed embodiment of the circuit with a transistor-diode combination 3 makes this option possible in the following manner:

When the synchronous motor 2 reaches, for example, one of its end positions, there is a significant change in the voltage drop across the motor coil 2.1, which receives current from the phase capacitor 13. An overshoot of the controlled pull-out torque $M_K$ can therefore be monitored by a voltage measurement, and the synchronous motor 2 can be switched off at the end positions or in the event of an overload. The circuit arrangement 1 according to the invention is therefore able to independently detect the control range of the synchronous motor 2. Alternatively, loss of synchronization can be detected by analyzing the phase shift between the two measured voltages $U_1$ and $U_2$. This phase shift is approximately 90° in normal operation and changes significantly when the synchronous motor 2 reaches an end position.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A circuit arrangement for generating motor characteristic curves for stabilizing the pull-out torque of a two-phase synchronous motor, comprising
   a series-connected element connected between a first line conductor formed as a neutral conductor and a common phase of the synchronous motor, and a second line conductor implemented as a conductor connected with a phase of the synchronous motor,
   a transistor-diode combination employed as a voltage-controllable series-connected element,
   wherein for obtaining an approximately constant sinusoidal AC voltage amplitude and/or AC current amplitude through the synchronous motor, the transistor designed for the maximum peak voltage of the oscillating line voltage and having an operating point controllable by an analog control signal is a non-switched bipolar transistor or field effect transistor (FET), and the diodes are implemented as a rectifier bridge.

2. The circuit arrangement according to claim 1, further comprising an internal evaluation and control unit for generating the analog internal control voltage $U_{St}$ of the bipolar transistor, wherein
   a. the evaluation and control unit is coupled with the base of the bipolar transistor,
   b. the voltage point U+ of the rectifier bridge is coupled with the collector of the bipolar transistor, and
   c. the voltage point U− of the rectifier bridge is coupled with the emitter of the bipolar transistor as well as with the evaluation and control unit.

3. The circuit arrangement according to claim 2, wherein for generating the analog internal control voltage $U_{St}$ of the bipolar transistor, the internal evaluation and control unit is configured to receive the load current of the transistor or the voltage drop across the synchronous motor.

4. The circuit arrangement according to claim 1, wherein an internal evaluation and control unit is provided for generating the internal control voltage $U_{St}$ of the field effect transistor (FET), wherein
   the voltage point U+ of the rectifier bridge is coupled with the drain of the FET,
   the evaluation and control unit is coupled with the source of the FET and the voltage point U− of the rectifier bridge, and
   the gate of the FET is coupled with the voltage point U− of the rectifier bridge.

5. The circuit arrangement according to claim 4, wherein for generating the internal control voltage $U_{St}$ of the FET, the internal evaluation and control unit is configured to receive the load current of the FET.

6. The circuit arrangement according to claim 4, wherein the FET is implemented as a normally-on SFET, which is controlled by the voltage drop across a current-sensing resistor disposed between the source and the voltage point U−.

7. The circuit arrangement according to claim 2, wherein the evaluation and control unit is coupled with the motor coils and the transistor for voltage measurement and monitoring.

8. The circuit arrangement according to claim 7, wherein the voltage measurement and monitoring and/or a measurement of the phase angle on the motor coils is used for electronic detection of the end position of the synchronous motor.

9. The circuit arrangement according to claim 2, wherein an external control unit, which is galvanically decoupled from the evaluation unit and implemented as a microcontroller, is provided for generating the control voltage of the transistor.

10. The circuit arrangement according to claim 1 wherein for switching off the synchronous motor upon reaching its end positions, the transistor is completely blocked, thereby interrupting the common phase of the synchronous motor.

* * * * *